W. M. LEARNED.
TROLLEY.
APPLICATION FILED APR. 21, 1913.
1,108,195.
Patented Aug. 25, 1914.
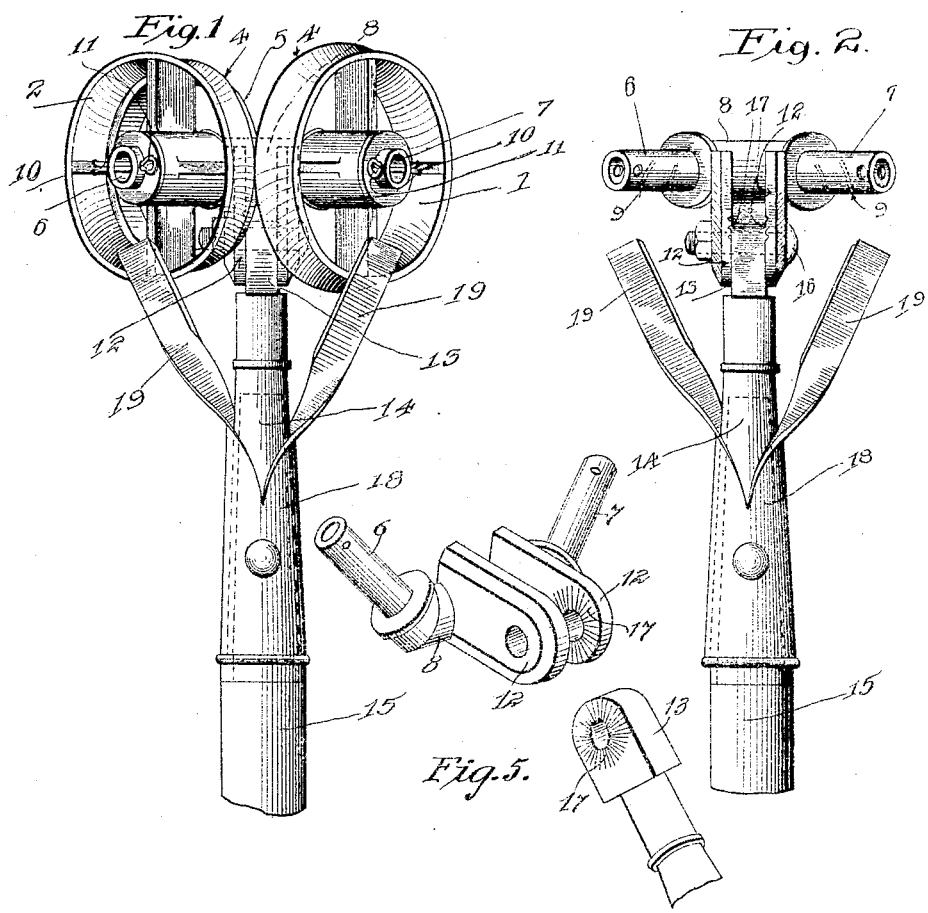
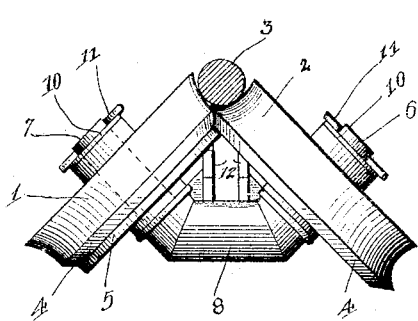
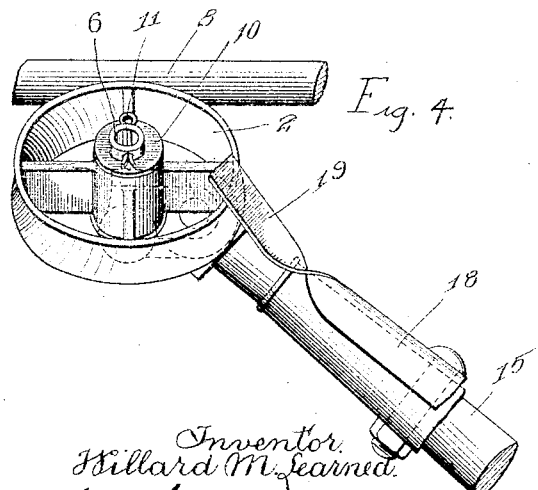
Witnesses:
Inventor.
Willard M. Learned.

UNITED STATES PATENT OFFICE.

WILLARD M. LEARNED, OF LOS ANGELES, CALIFORNIA, ASSIGNOR OF ONE-THIRD TO J. H. MIXER AND ONE-THIRD TO WILLIAM JOCHUM, BOTH OF LOS ANGELES, CALIFORNIA.

TROLLEY.

1,108,195.   Specification of Letters Patent.   Patented Aug. 25, 1914.

Application filed April 21, 1913.   Serial No. 762,727.

*To all whom it may concern:*

Be it known that I, WILLARD M. LEARNED, a citizen of the United States, residing at Los Angeles, in the county of Los Angeles and State of California, have invented a new and useful Trolley, of which the following is a specification.

This invention relates to trolleys and has for its object to provide a trolley which will not easily jump off from the wire and which will present a comparatively large contact area with the wire, and wear for a much longer period than the single wheel trolley.

Other objects and advantages will be brought out in the following description.

Referring to the drawings: Figure 1 is a plan view of the trolley. Fig. 2 is a view similar to Fig. 1, with the trolley wheels removed. Fig. 3 is an end view showing the trolley wire in cross section. Fig. 4 is a side elevation. Fig. 5 is a perspective view illustrating certain details of construction in my invention.

The prominent feature of the invention is the two trolley wheels 1 and 2 which are provided with grooved peripheries and so mounted that they operate on axes inclined to each other, and the trolley wheels contact with each other and combine to form a deep groove which receives the trolley wire 3. Each trolley wheel has a beveled edge 4 and the beveled edges 4 form the contacting surface between the two trolley wheels. One of the trolley wheels, for example, the wheel 1, also has a shoulder 5 on which the lower edge of the trolley wheel 2 runs, and which gives additional support.

The trolley wheels are mounted on stationary shafts 6 and 7 which project from a head 8 and are preferably integral therewith. Each of the shafts 6 and 7 is hollow and provided with spiral grooves 9, so that a lubricant may be placed inside the shafts and allowed to work out through the grooves 9 to lubricate the trolleys. Washers 10 and cotter pins 11 retain the trolley wheels on the shafts. The head 8 has formed thereon a pair of ears 12 which receive a tongue 13 on the end of a socket 14 carried on the upper end of the trolley pole 15, a bolt 16 passes through the ears 12 and tongue 13 whereby the head 8 is pivoted upon the trolley pole so that the wheels may be adjusted to any desired angle upon the trolley pole with relation to the conductor. The bolt 16 is provided with a nut adapted to engage one of the ears 12 to secure the trolley wheels in any adjusted position. The respective co-acting faces of the ears 12 and tongue 13 are provided with serrations 17 to prevent slipping of head out of adjustment.

A bifurcated shield 18 is carried on the socket 14 and has two members 19 which extend to a point directly in front of the two trolley wheels and which act to prevent the device from catching on the overhead structure should the trolley pole swing upward and the trolley not catch on the trolley wire. The two wheels working at an angle to each other and contacting with each other at the beveled edge act to mutually nullify the strain from the trolley wire tending to tilt the wheels laterally on their axes, and thus cause the wheels to bear radially against their axles and insure smooth running and avoids wear. The annular beveled edge 4 of wheel 2 is larger in diameter than the corresponding annular beveled edges of wheel 1, which brings the point of contact of said edges at one side of the center of the groove formed by the peripheries of the wheels at their point of coöperation so that the wheel 2 presents greater contact surface to the conductor 3 than the wheel 1, and thereby receives the greater portion of the downward reaction of said conductor. The annular shoulder 5 contacting with the lower surface of the wheel 2, supports the wheel 2 rigidly against said downward reaction of the trolley conductor.

In the usual single trolley with deep groove, there is considerable wear and friction caused by slippage between the wire and those parts of the groove of the wheel which travel at different peripheral speeds according to their various distance from the axis, while in the present case the contact with the wire is a rolling contact with little slippage, because the wheels rotate on inclined axes and while the combined contact arc of both wheels may equal that of the single wheel, with the inclined wheels each one embraces one half the total arc of contact and thus the difference in radius of its extreme contact portion is substantially one half that of the single wheel and therefore, substantially about one half the slippage and hence half the wear.

What I claim is:

1. A trolley comprising a pair of wheels rotatably mounted upon fixed centers adapted to receive the trolley conductor, one of said wheels adapted to receive the greater portion of the downward thrust of the trolley conductor, and means for bracing said wheel against the downward thrust of the trolley conductor.

2. A trolley comprising a pair of angularly disposed wheels, a pair of upwardly diverging axles fixed with relation to each other, upon which said wheels are mounted, said wheels adapted to contact with each other and grooved to receive the trolley conductor, the walls of the groove formed by said wheels diverging upwardly and the upper gap between said wheels being of sufficient width to permit free and easy entrance of the trolley conductor thereinto.

3. A trolley comprising a pair of wheels arranged at an angle to each other and adapted to contact with each other to receive the trolley conductor, said wheels being provided with a pair of annular contacting surfaces, the wheels being of relatively different diameters at their contacting surfaces so that the point of contact of said surfaces lies at one side of the center of the groove formed by the peripheries of the wheels whereby the wheel of a greater diameter will present a greater contact surface to the trolley conductor and receive the greater portion of the downward reaction of the trolley conductor, and means comprising an annular shoulder on one wheel for sustaining the other wheel against said downward reaction of the trolley conductor.

4. A trolley comprising a head and a pair of angularly disposed wheels mounted upon said head adapted to co-act with each other to receive the trolley conductor, said head provided with ears, a tongue on the end of the trolley pole adapted to fit between said ears, a bolt extending through said ears and tongue to pivot the head and wheels to the trolley pole whereby the said head and wheels may be adjusted to the trolley conductor, the respective co-acting surfaces of said ears and tongue being provided with serrations to prevent the head and wheels slipping out of adjustment.

5. A trolley comprising a pair of wheels rotatably mounted upon fixed centers adapted to receive the trolley conductor, one of said wheels adapted to receive the greater portion of the downward thrust of the trolley conductor, said wheels provided with contacting surfaces to brace the wheel receiving the greater portion of the downward thrust of the conductor against said downward thrust.

In testimony whereof, I have hereunto set my hand at Los Angeles, California this 12th day of April, 1913.

WILLARD M. LEARNED.

In presence of—
GEO. T. HACKLEY,
MARTHA M. LANGE.

---

Copies of this patent may be obtained for five cents each, by addressing the "Commissioner of Patents, Washington, D. C."